United States Patent [19]

Sakamoto et al.

[11] Patent Number: 4,676,635

[45] Date of Patent: Jun. 30, 1987

[54] OPTICAL FIBER CHARACTERISTIC MEASURING METHOD AND APPARATUS

[75] Inventors: Katsuji Sakamoto; Akio Ohta; Yuichi Toda; Shuzo Suzuki; Takashi Ide, all of Kanagawa, Japan

[73] Assignee: Sumitomo Electric Industries, Ltd., Osaka, Japan

[21] Appl. No.: 705,837

[22] Filed: Feb. 26, 1985

[30] Foreign Application Priority Data

Oct. 25, 1984 [JP] Japan ................................ 59-223011

[51] Int. Cl.⁴ ...................... G01N 21/84; G01N 21/88
[52] U.S. Cl. ..................................... 356/73.1; 356/244
[58] Field of Search ............................... 356/73.1, 244

[56] References Cited

FOREIGN PATENT DOCUMENTS 2506939 12/1982 France ............................... 356/73.1

*Primary Examiner*—Vincent P. McGraw

*Attorney, Agent, or Firm*—Sughrue, Mion, Zinn, Macpeak and Seas

[57] ABSTRACT

An optical fiber characteristic measuring method and apparatus are disclosed whereby measurements of a plurality of different parameters of an optical fiber can be carried out automatically and successively with a minimum of operator time required. A stage is provided which is movable along a straight line, and a setting station is arranged in the direction of movement of the stage. A plurality of measurement stations are provided having first holders for holding fibers provided on the side of the measuring devices and arranged along a straight line extending parallel to the direction of movement of the stage with a predetermined distance therebetween. The stage is provided with a plurality of second holders for holding the optical fibers to be measured, with the second holders being arranged along a straight line extending parallel to the direction of arrangement of the first holders with the same distance as the predetermined distance therebetween.

11 Claims, 14 Drawing Figures

OPTICAL FIBER CHARACTERISTIC MEASURING METHOD AND APPARATUS

BACKGROUND OF THE INVENTION

The present invention relates to an optical fiber characteristic measuring method and apparatus. More particularly, the invention pertains to an optical fiber characteristic measuring method and apparatus for automatically and continuously measuring a number of parameters such as transmission loss and transmission bandwidth.

Optical fibers have transmission characteristics such as a transmission loss characteristic, scattering characteristic and transmission bandwidth characteristic. Of these characteristics, the transmission loss characteristic and the transmission bandwidth characteristic are most important.

Heretofore, the transmission loss characteristic has been measured according to a transmission method in which the amount of attenuation of light propagating in an optical fiber under measurement is measured, or according to a back scattering method of measuring Rayleigh scattered light and Fresnel reflection light in an optical fiber under measurement. The transmission bandwidth characteristic is usually measured using the transmission method. In any one of the above-described methods, it is essential to couple the optical fiber to be measured to optical fibers provided on the side of a measuring device (see "Optical Fiber Cable", Hideo Fukutomi, Ohm Co., July 10, 1983, pp. 255-302). Accordingly, the degree of coupling of an optical fiber to be measured to optical fibers provided on the side of the measuring device greatly affects the accuracy and efficiency in measurement of the optical fiber characteristic measuring apparatus.

Figure 1:
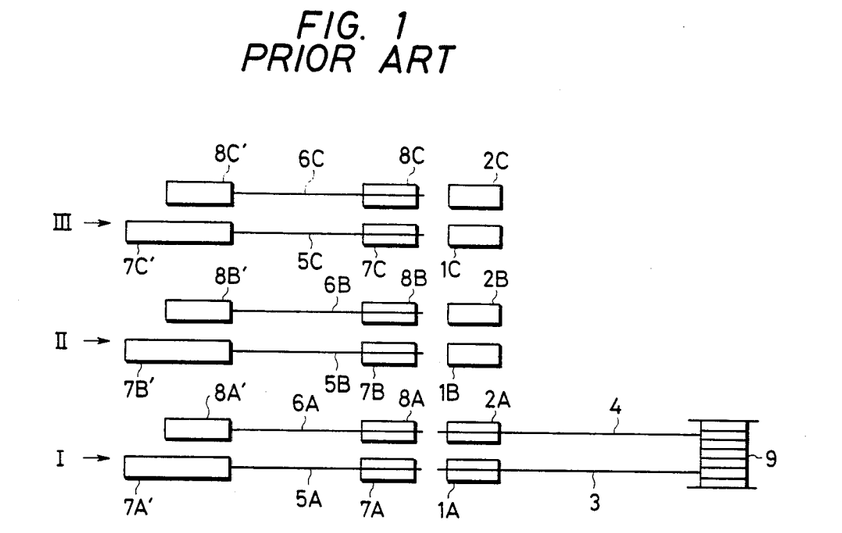
FIG. 1 is a diagram outlining the arrangement of a conventional optical fiber characteristic measuring apparatus operating according to a transmission method.

FIG. 1 is a diagram outlining the arrangement of a conventional optical fiber characteristic measuring apparatus operating in accordance with the transmission method. As shown in FIG. 1, aligning stands 1A and 2A, 1B and 2B and 1C and 2C are adapted to hold two end portions 3 and 4 of an optical fiber under measurement and to cause the end faces of the two end portions 3 and 4 to abut against the end faces of optical fibers 5A and 6A, 5B and 6B, and 5C and 6C provided on the side of measuring devices, and to align the two end portions 3 and 4 with the optical fibers 5A and 6A, 5B and 6B, and 5C and 6C. First end portions of the optical fibers 5A, 5B and 5C, and 6A, 6B and 6C are held by holders 7A, 7B and 7C, and 8A, 8B and 8C, respectively. The other end portions of the optical fibers 5A, 5B and 5C are connected to optical detectors 7A', 7B' and 7C', respectively. The other end portions of the optical fibers 6A, 6B and 6C are connected to light sources 8A', 8B' and 8C', respectively. The above-described components are, in general, installed on the surface of a table (not shown) as an integral unit. In FIG. 1, reference numeral 9 designates a bobbin on which the optical fiber to be measured is wound.

The operation of the measuring apparatus thus constructed will be described.

First, two end portions of an optical fiber to be measured are set on the aligning stands 1A and 2A after being suitably treated (the covers removed and the fibers cut). Then, the end faces of the two end portions 3 and 4 of the optical fiber under measurement are abutted against the end faces of the optical fibers 5A and 6A held by the holders 7A and 8A, respectively, and the two end portions 3 and 4 are aligned with the optical fibers 5A and 6A, respectively. This adjustment is carried out by aligning mechanisms (not shown) provided on the aligning stands 1A and 2A. Each aligning mechanism can finely displace the respective end portion of the optical fiber in the axial direction thereof, i.e., in Z direction, and in two other directions perpendicular to each other and to the axial direction of the optical fiber, i.e., in X and Y directions. The adjustment can be achieved with a three-direction (X, Y, Z) micromotion stand, or it can be carried out automatically.

After the adjustment has been accomplished, light from the light source 8A' is applied to the optical fiber under measurement, and the optical detector 7A' measures the light propagating through the optical fiber. Thus, one measurement parameter, such as transmission loss, has been measured at the station I. Next, the bobbin 9 is manually shifted to the next station, and the operator similarly measures the other characteristics of the optical fibers at stations II and III in succession.

In the measurement of the characteristics of an optical fiber with such an optical fiber characteristic measuring apparatus, the period of time required for manual operations such as preparations for coupling two ends of an optical fiber to be measured to the ends of optical fibers provided on the side of a measuring device (treating the end faces of the optical fiber to be measured, setting the end portions of the optical fiber on the aligning stands, coupling the two ends of the optical fiber to be measured with the ends of the optical fibers provided on the side of the measuring device, and removing the optical fiber after measurement) is substantially equal to the period of time required for making actual measurements with the device and processing the measurement data. Accordingly, the number of measurement parameters which can be handled by one operator simultaneously is only one; that is, the conventional measuring apparatus is considerably low in its efficiency of measurement.

SUMMARY OF THE INVENTION

In view of the above-described difficulties accompanying a conventional optical fiber characteristic measuring apparatus, an object of the invention is to provide an optical fiber characteristic measuring method and apparatus with which one operator can measure more than two characteristics of an optical fiber with a high efficiency.

More specifically, the invention is intended to provide an optical fiber characteristic measuring method and apparatus with which more than two characteristics of optical fibers can be measured in a parallel mode.

Provided according to the invention is an optical fiber characteristic measuring apparatus which comprises: a movement stage which is movable straightly, a setting station arranged in the direction of movement of the movement stage, and a plurality of measurement stations having first holders which are adapted to hold optical fibers provided on the side of measuring devices and are arranged in a single straight line parallel to the direction of movement of the movement stage with a predetermined distance therebetween, the movement stage having a plurality of second holders which are adapted to hold optical fibers to be measured and are arranged in a single straight line parallel to the direction of arrangement of the first holders with the same distance as the predetermined distance therebetween. The invention also provides a method which this apparatus implements.

Provided according to the invention is a method for measuring characteristics of an optical fiber with a measuring apparatus having plural measurement stations, a setting station, and a movement state, comprising the steps of:

(a) moving the movement stage relative to a first of the measurement stations so that at light incidence end of an optical fiber to be measured and a light emergence end of an optical fiber provided on the side of a measuring device at the first measurement station are located adjacent one another;

(b) adjusting a position of each of two end portions of the optical fiber to be measured in two directions perpendicular to each other; and (c) adjusting a position of each of two end portions of the optical fiber to be measured in an axial direction thereof so that the light incidence end and light emergence end are aligned with end faces of the two end portions of the optical fiber to be measured.

In the optical fiber characteristic measuring method and apparatus of the invention, the distance between the first holders adapted to hold optical fibers provided on the side of the measuring device at each measurement station is equal to that between the second holders adapted to hold two end portions of an optical fiber on the movement stage. Therefore, after the two end portions of an optical fiber to be measured have been set on the second holders, by moving the movement stages, the end faces of the two end portions of the optical fiber can be coupled successively to the optical fibers held by the first holder at the measurement station. Therefore, the characteristics of a plurality of optical fibers, after being set in place at the setting station, can be measured successively at the measurement station.

DESCRIPTION OF THE PREFERRED EMBODIMENTS

An example of an optical fiber characteristic measuring apparatus constructed according to this invention will be described with reference to the accompanying drawings.

Figure 2:
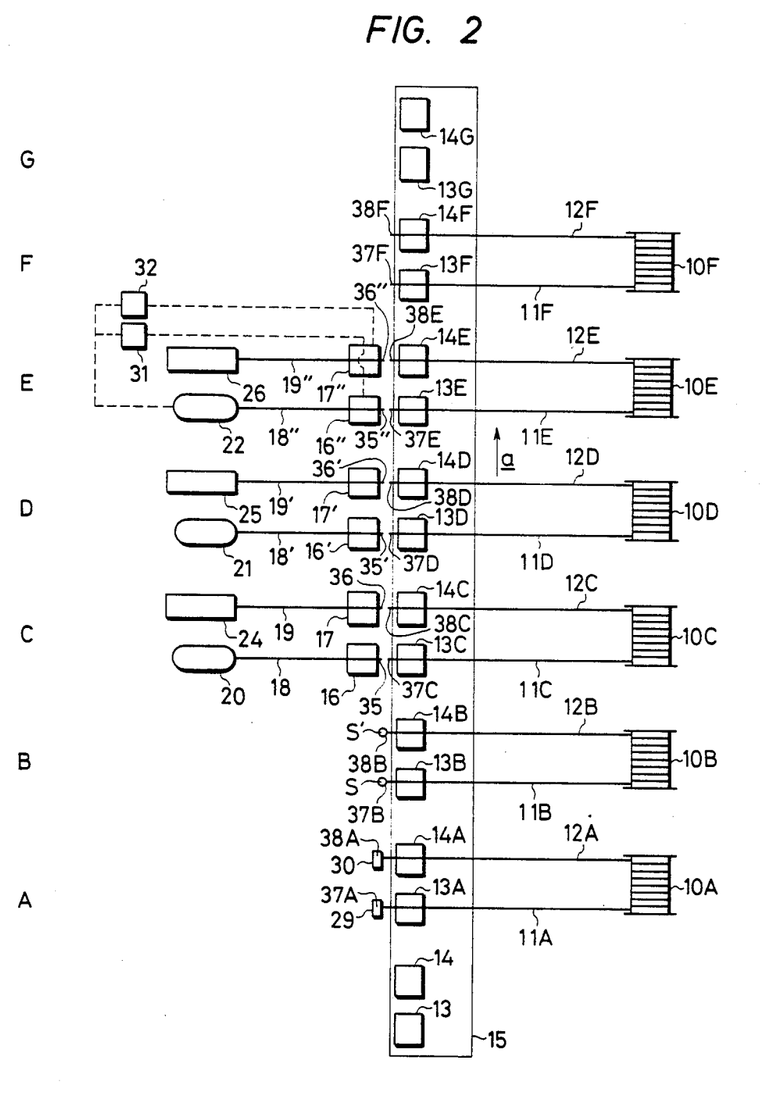
FIG. 2 is a diagram outlining the arrangement of an example of an optical fiber characteristic measuring apparatus according to this invention.

FIG. 2 is a diagram outlining the arrangement of a preferred embodiment of an optical fiber characteristic measuring apparatus according to the invention. FIG. 2 shows optical fibers under measurement.

In FIG. 2, reference numerals 10A through 10F designate bobbins on which optical fibers under measurement are wound, the bobbins being set on moving stands (not shown). First end portions 11A through 11F of the optical fibers wound on the bobbins 10A through 10F are held by respective ones 13A through 13F of the eight holders 13 and 13A through 13G for optical fibers to be measured which are provided on a movement stage 15. The other end portions 12A through 12F are held by respective ones 14A through 14F of the eight holders 14 and 14A through 14G for optical fibers to be measured, which are also provided on the movement stage 15. As will become apparent from the following description, the holders 13 through 13G are provided on the light emergence side, and the holders 14 through 14G are provided on the light incidence side.

The movement stage 15 is elongated as shown in FIG. 1. The holders 13 through 13G and 14 through 14G are aligned on the movement stage 15 in such a manner that they are arranged in the longitudinal direction of the movement stage, the light emergence side holders 13 through 13G are equally spaced from the light incidence side holders 14 through 14G, respectively, and the light emergence side holders 13 through 13G are equally spaced from one another, and accordingly the light incidence side holders 14 through 14G are arranged at equal intervals.

On the side of the movement stage 15 opposite the side where the bobbins 10A through 10F are located, holders 16, 16' and 16" and 17, 17' and 17" for holding optical fibers provided on the side of measuring devices are arranged in a line in parallel to the direction of arrangement of the holders 13 through 13G and 14 through 14G for optical fibers to be measured. The measuring device side holders 16 through 16" and 17 through 17" hold first end portions of optical fibers 18, 18' and 18" and 19, 19' and 19", respectively, provided on the measuring device side. The other ends of the measuring device side optical fibers 18, 18' and 18" are connected to optical detectors 20, 21 and 22, respectively. The optical detectors 20, 21 and 22 are connected respectively to processing units (not shown) which process measurement data. The other ends of the measuring device side optical fibers 19, 19' and 19" are connected to light sources 24, 25 and 26 respectively.

The respective distances between the light reception side fiber holders and the light source side holders 16 and 17, 16' and 17', and 16" and 17" are equal to that between the light incidence side holder 14 and the light emergence side holder 13. Furthermore, the light reception side fiber holders 16, 16' and 16" are arranged at the same interval as the light emergence side holders 13 through 13G.

The operator (or an automatic drive device, not shown) moves the movement stage 15 in its longitudinal direction (in the direction of the arrow a) in such a manner that the movement stage 15 moves in steps which correspond in length to the intervals of the light incidence holders 13 through 13G.

The automatic drive device may be made up of a feed screw mechanism for moving the movement stage along a guide and a reversible pulse motor for driving the feed screw. If the number of drive pulses for the pulse motor is set to a suitable value, the movement stage can be moved in steps of the desired distance. As the movement stage 15 is moved as described above, the moving stand carrying the bobbins 10A through 10F is also moved by another automatic drive device (not shown) one step at a time (in the direction of the arrow a).

When optical fibers under measurement are set in place on the light emergence side holders 13 through 13G and the light incidence side holders 14 through 14G and the measuring device side optical fibers 18 through 18" and 19 through 19" are set in place on measuring device side fiber holders 16 through 16" and 17 through 17", then the ends 35 through 35" of the measuring device side optical fibers 18 through 18" and the ends 36 through 36" of the measuring device side optical fibers 19 through 19', are arranged in a first line, while the ends 37A through 37F and 38A through 38F of the optical fibers to be measured are arranged in a second line. These first and second lines are parallel to each other with a short distance therebetween, for instance, 10 to 50 microns.

In FIG. 2, photosensors S and S' are provided below the measuring device side holder 16 to detect the ends of an optical fiber under measurement. The distance between the photosensors S and S' is equal to that between the light emergence side holder 13 and the light incidence side holder 14. Stops 29 and 30, against which both ends of an optical fiber to be measured are abutted, are provided below the photosensors S and S'. The distance between the stops 29 and 30 is equal to that between the holder 13 and 14.

The photosensors S and S' and the stops 29 and 30 are positioned along a straight line which connects the ends 35 through 35" and 36 through 36" of the measuring device side optical fibers 18 through 18" and 19 through 19" when correctly set on the fiber holders 16 through 16" and 17 through 17" provided on the measuring device side. The distance between the light reception side optical fiber holder 16 and the photosensor S and the distance between the photosensor S and the stop 29 are equal to the distance between any adjacent two of the light emergence side holders 13 through 13G. Accordingly, the distance between the light source side holder 17 and the photosensor S' and the distance between the photosensor S' and the stop 30 are equal to the distance between any adjacent two of the light incidence side holders 14 through 14G.

In the optical fiber characteristic measuring apparatus thus constructed, the area where the stops 29 and 30 are arranged is referred to as "the first setting station A", the area where the photosensors S and S' are arranged is referred to as "the second setting station B", and the areas where the optical detectors 20, 21 and 22 and the light sources 24, 25 and 26 are arranged are referred to as "measurement stations C, D and E", respectively. Auxiliary stations F and G are provided above the measurement station E.

Figure 3:
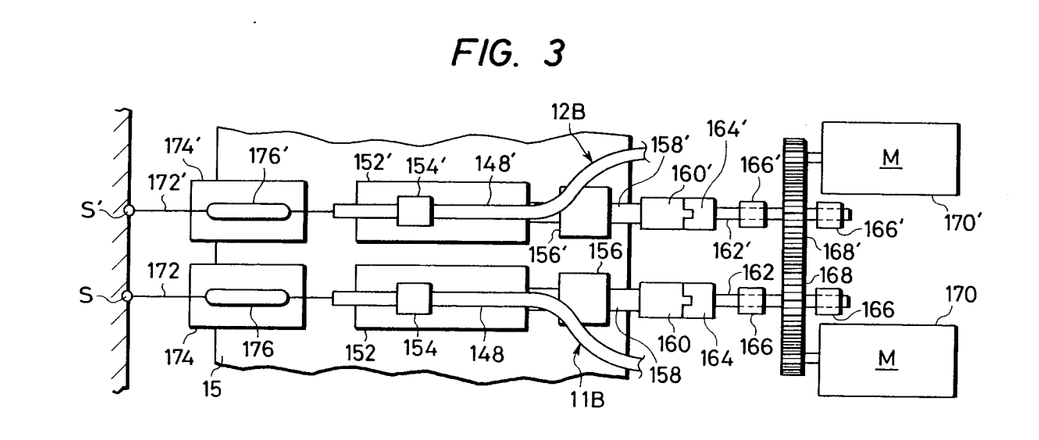
FIGS. 3 and 4 are a plan view and a side view, respectively, showing holder provided for an optical fiber under measurement and an example of a mechanism for positioning the two end portions of the optical fibers in the axial direction thereof in the measuring apparatus.
Figure 4:
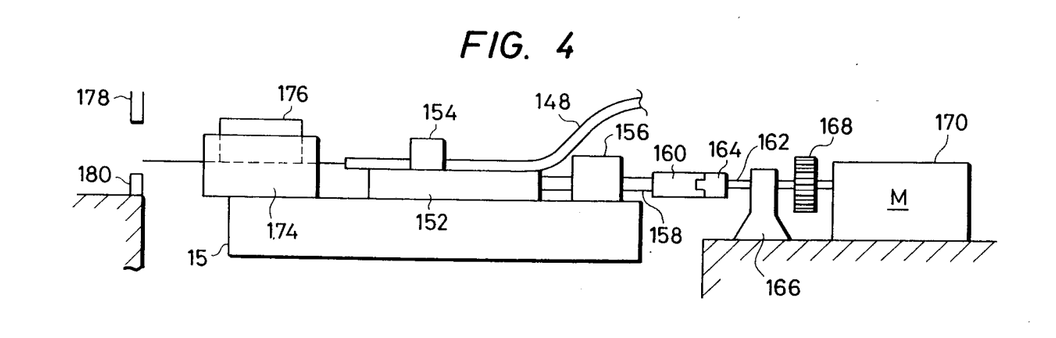

The fiber holders provided for optical fibers under measurement and their related components will be described. The pairs of holder 13 and 14, 13A and 14A, ... and 13G and 14G are the same in construction. Therefore, only one pair of holders will be described. FIG. 3 is a top view of the holders 13B and 14B provided at the second setting station B showing the end portions of an optical fiber to be measured which are positioned in the fiber axis direction, and FIG. 4 is a side view thereof.

The covered parts 148 and 148' of both end portions 11B and 12B of an optical fiber to be measured, which is wound on the bobbin 10A set on the moving stand (not shown), are placed on covered-part retaining stands 152 and 152' and retained by covered-part retainers 154 and 154', respectively. The covered-part retaining stands 152 and 152' can be displaced in the fiber axis direction by feed screws 158 and 158' which are rotatably supported by supporting stands 156 and 156', respectively. The feed screws 158 and 158' form a feed mechanism, which should be constructed with a high precision. Couplings 160 and 160' are detachably connected to the rear ends of the feed screws 158 and 158', respectively.

The couplings 160 and 160' are coupled to the couplings 164 and 164' of the drive shafts 162 and 162', respectively, of a drive mechanism provided at the second setting station. The drive shafts 162 and 162' are supported by bearings 166 and 166', respectively. The rotations of motors 170 and 170' are transmitted to the drive shafts 162 and 162' through corresponding reduction gear mechanisms 168 and 168', which have a large reduction gear ratio.

Figure 5:
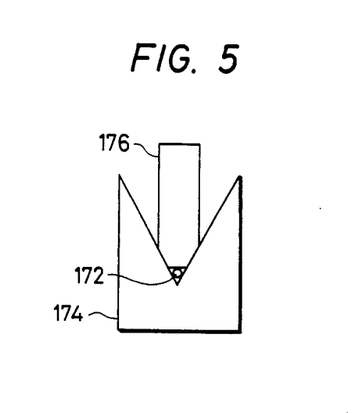
FIG. 5 is a sectional view of a V-block showing an example of the holder provided for optical fibers to be measured.

The covers and coating layers are removed from the end parts 172 and 172' of the covered parts 148 and 148' of the two end portions 11B and 12B of the optical fiber to be measured. The end parts 172 and 172', after being cleaned, are placed on the bottoms of the V-shaped grooves of V-blocks 174 and 174' whose sections are as shown in FIG. 5. Thereafter, the end parts 172 and 172' are slidably retained by retainers 176 and 176', respectively. The V-shaped grooves of the V-blocks 174 and 174' and the retainers 176 and 176' are machined with a high precision, and therefore the ends of the optical fiber to be measured can be positioned and orientated with a high accuracy.

With the holders thus constructed, the two end portions of the optical fiber cannot be moved in a direction perpendicular to the fiber axis direction, and can be moved only in the fiber axis direction. The V-shaped grooves of the V-blocks 174 and 174' and the retainers 176 and 176' form the holders 13B and 14B, holding the end portions of an optical fiber under measurement and providing a predetermined distance between the two end portions of the optical fiber.

The rotational movements of the motors 170 and 170' are transmitted to the feed screws 158 and 158' so that the two end portions of the optical fiber are moved only in the fiber axis direction.

The above-described photosensors S and S' are provided ahead of the optical fiber holders 13B and 14B. Each of the photosensors has a light emergence optical fiber 178 and a light reception optical fiber 180 which are coupled to a light source and an optical detector (not shown), respectively. These optical fibers 178 and 180 are positioned on opposite sides of an extension of the axis of the optical fiber's end portion which is held by the optical fiber holder (13B or 14B).

The optical fibers 178 and 180 have a core diameter of several tens of microns. The diameter of the optical fiber to be measured from which the coating has been removed is 100 to 150 microns in the case where it is a single-mode optical fiber and 100 to 250 microns in the case where it is a multi-mode optical fiber. Therefore, the optical fiber under measurement can completely intercept the light beam which exits the light emergence optical fiber 178 and passes to the light reception optical fiber 180. The light beam from the end face of the light emergence optical fiber 178 scatters to some extent, and therefore only the central part of the light beam is applied to the light reception optical beam 180. Accordingly, even if the core diameter is several tens of microns, the diameter of the light beam used for optical detection can be decreased by suitably determining the distance between the optical fibers 178 and 180. If 50% of the maximum value of the output voltage provided by the optical detector connected to the light reception optical fiber is employed as a threshold value to determine the light interception, i.e., if, when the output voltage is as low as 50% of its maximum value, it is determined that light interception has occurred, then the end portion of the optical fiber under measurement can be positioned with an accuracy of the order of several microns.

The operation of the optical fiber characteristic measuring apparatus shown in FIG. 2 will now be described.

First, the movement stage 15 is positioned in the lower part of FIG. 2 so that the holders 13G and 14G are positioned at the first setting station A. Under this condition, the operator sets both end portions of an optical fiber to be measured on the holders 13G and 14G, respectively. In this operation, the ends of the optical fiber are lightly abutted against the stops 29 and 30, respectively, or considerably small gaps are provided between the ends and the stops 29 and 30, respectively. The V-blocks position the two end portions of the optical fiber under measurement in such a manner that the predetermined distance is provided therebetween, and positions them in the X and Y directions, which are perpendicular to the axis of the optical axis and form right angles with one another.

After the optical fiber has been set in place on the holders 13G and 14G, the movement stage is moved one step, i.e., one interstation distance, in the direction of the arrow a, so that the two end portions of the optical fiber on the holders 13G and 14G are positioned at the second setting station B.

As described above, the distance between the holders of each pair, the distance between the stops 29 and 30 and the distance between the photosensors S and S' are equal to one another, and the distance between any adjacent two pairs of holders is equal to that between the stop 29 and the photosensor S. Therefore, when the movement stage has been moved as described above, the optical fiber's two end portions held by the holders 13G and 14G are positioned so that extensions thereof pass through the photosensors S and S', respectively, at the second setting station B.

At the second setting station B, the couplers 160 and 160' of the holders 13G and 14G are coupled to the couplers 164 and 164', and the two end portions of the optical fiber to be measured are positioned in the fiber axis direction. On the other hand, the two end portions 11F and 12F of the optical fiber to be measured which has been wound on the bobbin 10F are set on the holders 13F and 14F in the same manner.

Thereafter, the movement stage 15 is moved one step, i.e., one interstation distance in the direction of the arrow a, so that the optical fiber's two end portions held by the holders 13G and 14G are positioned at the measurement station C while the optical fiber's two end portions 11F and 12F held by the holders 13F and 14F are positioned at the second setting station B.

As described above, the distance between the holders in each of the pairs of holders provided for optical fibers to be measured, the distance between the stops 29 and 30, the distance between the photosensors S and S', the distance between the measuring device side holders 16 and 17, the distance between the measuring device side holders 16' and 17', and the distance between the measuring device side holders 16" and 17" are the same, and the distance between any two adjacent pairs of holders provided for optical fibers to be measured, the distance between the photosensor S and the stop 29, the distance between the measuring device side holders 16 and 16', and the distance between the holders 16' and 16" are equal to one another. The photosensors S and S' are arranged along a straight line, while the ends 35 and 36, 35' and 36', and 35" and 36" of the measuring device side optical fibers which are held by the holders 16 and 17, 16' and 17', and 16" and 17", respectively, are arranged on another straight line which is parallel to and closely adjacent the other straight line. Therefore, when the movement station is moved as described above, at the measurement station C, the optical fiber's two end portions held by the holders 13G and 14G are aligned with the ends of the measuring device side optical fibers 18 and 19 with a predetermined gap therebetween. Under this condition, measurement of a first measurement parameter is effected on the optical fiber held by the holders 13G and 14G.

At the second setting station B, the couplers 160 and 160' of the holders 13F and 14F are connected to the couplers 164 and 164, respectively, so that the two end portions of the optical fiber to be measured can be positioned in the fiber axis direction. The two end portions 11E and 12E of the optical fiber to be measured which has been wound on the bobbin 10E are set on the holders 13E and 14E in the same manner.

Thereafter, while the movement stage 15 is moved one step at a time, both end portions of an optical fiber to be measured are set on the light incidence side holder and the light emergence side holder at the first setting station A, their positions in the fiber axis direction are adjusted at the second setting station B, and their characteristics are measured at the measurement stations C, D and E.

When the optical fiber under measurement reaches the auxiliary station F or G, it is removed from the holders. FIG. 2 shows the case where the optical fiber passed through the measurement has been removed from the holders at the auxiliary station G.

In the above-described optical fiber characteristic measuring apparatus, after an optical fiber to be measured is set in position, the movement stage is linearly moved in steps until all the required characteristics have been measured, and at each measurement station it is unnecessary to adjust the positions of the two end portions of the optical fiber; i.e., the ends of the optical fiber are held coaxial with the ends of the optical fibers provided on the side of the measuring device with a predetermined gap therebetween. Accordingly, the operator can measure a number of different characteristic parameters of optical fibers merely by setting the optical fibers in place on the movement stage.

In the above-described embodiment of an optical fiber characteristic measuring apparatus according to the invention, the drive mechanism for positioning the two end portions of an optical fiber to be measured (FIGS. 3 and 4) in the fiber axis direction is so designed that the couplings 160 and 160' are engaged with the couplings 164 and 164', respectively, to feed the two end portions of the optical fiber. The mechanism should be installed at a predetermined position only in the second setting station. In this case, the number of drive mechanism is a minimum, namely, one. However, whenever an optical fiber to be measured is delivered to the station B, it is necessary to engage the couplings 160 and 160' with the coupling 164 and 164', and whenever positioning the two end portions of an optical fiber in the fiber axis direction is accomplished, the couplings 160 and 160' must be disengaged from the couplings 164 and 164'. In order to eliminate this operation, a drive mechanism may be provided for each of the pairs of holders on the movement stage. This makes the mechanical arrangement on the movement stage intricate, but eliminates the need for manually engaging and disengaging the couplings.

In the holders and their relevant mechanisms shown in FIGS. 3 and 4, the covered-part retaining stands 152 and 152' are separated from the V-blocks 174 and 174', and the V-shaped grooves of the V-blocks are utilized to guide the two end portions of an optical fiber. The covered-part retaining stand and the V-block may be formed as a single unit slidably mounted on a guide, which provides excellent guide characteristics. In this case, the optical fiber to be measured is placed on the bottom of the V-shaped groove, but it will not slide on the bottom; that is, the unit moves on the guide in the fiber axis direction thereby to adjust the position of the optical fiber in the fiber axis direction.

Furthermore, in the second setting station, as shown in FIGS. 3 and 4, the two ends of the optical fiber to be measured are detected by the optical detecting method. The method may be replaced by a method of detecting the two ends of an optical fiber with a solid-state image sensor having a number of light-detecting elements or by detecting them visually with a microscope. However, it is desirable to employ a sensor with optical fibers because this permits automation of the measuring apparatus and provides a high measurement accuracy.

The operation of positioning the two end portion of the optical fiber in the fiber axis direction may be performed after the optical fiber, and accordingly the two end portions, have been delivered to each measurement station. For this purpose, a sensor having the optical fibers is provided at each measurement station, and the above-described operation at the second setting station B is carried out. This method is advantageous in that positioning of the two end portions of the optical fiber is not affected by the accuracy in movement of the movement stage.

In measuring the characteristics of an ordinary optical fiber, positioning of the two end portions of the optical fiber in two directions perpendicular to the fiber axis direction can be accomplished satisfactorily using the above-described V-blocks. However, depending on the particular parameter to be measured, it may be necessary that the two end portions of the optical fiber to be measured are aligned with the measuring device side optical fibers accurately. Such alignment with high accuracy should be performed at the measurement stations instead of the setting stations.

In FIG. 2, an aligning mechanism at the measurement station E is indicated by dotted lines. The aligning mechanism is used to accurately position optical fibers in two directions perpendicular to the fiber axis direction. In FIG. 2, reference numerals 31 and 32 designate alignment controllers. The alignment controller 31 is used to align the light reception side fiber holder 16", and the alignment controller 32 is used to align the light source side fiber holder 17".

Figure 6:
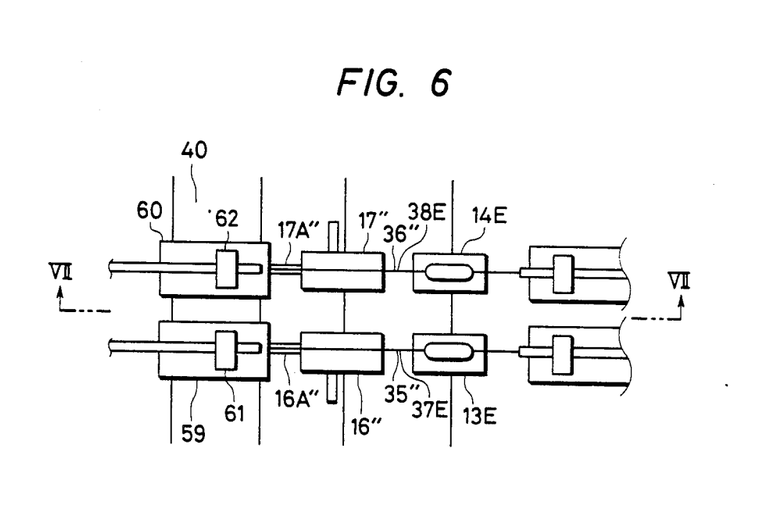
FIG. 6 is a plan view of a mechanism which is included in the optical fiber characteristic measuring apparatus in FIG. 2 to align optical fibers provided on the side of a measuring device with the two end portions of an optical fiber to be measured.
Figure 7:
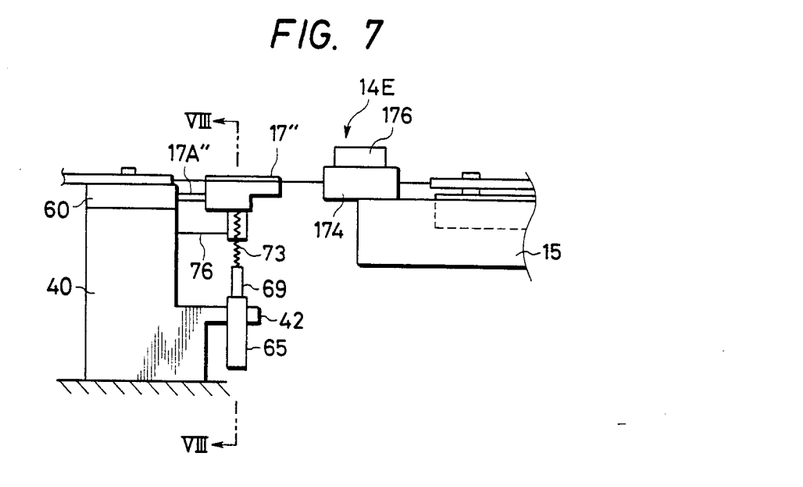
FIG. 7 is a sectional view taken along a line VI—VI in FIG. 6.
Figure 8:
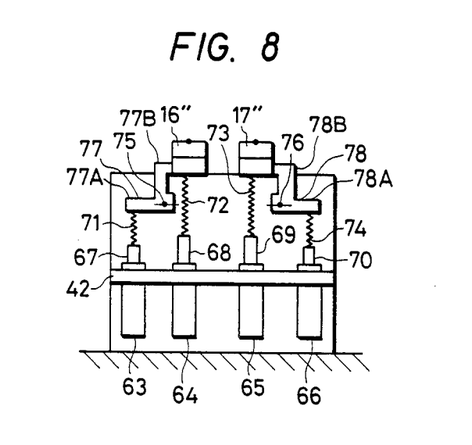
FIG. 8 is a sectional view taken along a line VII—VII in FIG. 7.

The aligning mechanism is arranged a shown in FIGS. 6, 7 and 8, of which FIG. 6 is a plan view of the aligning mechanism, FIG. 7 is a sectional view taken along a line VI—VI in FIG. 6, and FIG. 8 is a sectional view taken along line VII—VII in FIG. 7.

The measuring device side holders 16" and 17" hold on their tops the parts of the measuring device side optical fibers 18" and 19", respectively, from which the covers have been removed. The holders 16" and 17" are fixedly secured to covered-part retaining stands 59 and 60 through elastic arms 16A" and 17A", respectively. The covered-part retaining stands 59 and 60 are fixedly provided on a holder supporting stand 40. The covered parts of the optical fibers 18" and 19" are laid on the covered-part retaining stands 59 and 60 and are held by covered-part retainers 61 and 62 so that they can neither move nor rotate.

The holders 16" and 17" are supported by the arms 16A" and 17A", respectively, as described above. External forces can bend the arms 16A" and 17A" thereby to swing the holders perpendicularly to the fiber axis direction. In order to swing the measuring device side holders in this manner, piston cylinder type actuators 63, 64, 65 and 66 are provided on the front protrusion 42 of the holder supporting stand 40. The actuators 63, 64, 65 and 66 are connected to the lower ends of springs 71, 72, 73 and 74, respectively.

The springs 72 and 73 are abutted against the lower surfaces of the holders 16" and 17" to urge the latter substantially in the vertical direction, perpendicular to the measuring device side optical fibers. The other springs 71 and 74 are abutted against the lower surfaces of the horizontal arms 77A and 78A of L-shaped levers 77 and 78, respectively, which are rotatably mounted on pins 75 and 76 fixed to the holder supporting stand 40. The levers 77 and 78 have vertical arms 77B and 78B, respectively, which are abutted against the outer sides of the holders 16" and 17", respectively. Therefore, the forces of displacement of the springs 71 and 74 are converted by the L-shaped levers 77 and 78 into forces of displacement which act on the measuring device side holders in a horizontal direction, perpendicular to the measuring device side optical fibers.

The actuators 63 and 64, and 65 and 66 are controlled by the controllers 31 and 32, respectively. The controllers 31 and 32 control the actuators 63 through 66 to cause the optical detector 20 to provide maximum output, i.e., to make the degree of coupling a maximum, to change the forces of compression of the springs 71 through 74, thereby to adjust the positions of the measuring device side holders in the vertical and horizontal directions perpendicular to the measuring device side optical fibers. As a result, the ends 35" and 36" of the measuring device side optical fibers 18" and 19" held by the holders 16" and 17 are accurately aligned with the ends 37E and 38E of the two end portions 11E and 12E of the optical fiber under measurement which are held on the holders 13E and 14E, respectively.

Precise alignment is achieved by displacing the optical fibers provided on the measuring device side. The measuring device side holders are automatically positioned in two directions perpendicular to the fiber axis direction, as described above. Therefore, it is unnecessary to perform alignment on the side of the holders of optical fibers to be measured, which are stepwise moved. Accordingly, the number of movable components on the movement stage during movement of the movement stage can be reduced, increasing the accuracy in position of optical fibers under measurement, and the accuracy in position of the optical fibers on the movement stage can be maintained unchanged.

In the case where, because of the arrangement of the measuring apparatus, it is convenient to perform the alignment by moving the holders of the optical fibers under measurement, then the latter may be moved. Alignment in this case may be achieved completely in the same manner. Alignment may also be accomplished by moving the holders of the optical fiber to be measured and the measuring device side holders in different directions in such a manner that the former are moved vertically while the latter are moved horizontally.

In the aligning mechanism shown in FIGS. 6, 7 and 8, springs are compressed to move the measuring device side holders. However, since all that is required is to transmit the operations of the actuators, tensile forces may be utilized to move the holders.

The above-described optical fiber characteristic measuring device has two setting stations; however, it may be modified so that, at one setting station, two end portions of an optical fiber to be measured are set on the holders and are positioned in two directions perpendicular to the fiber axis direction.

In an example of such a modification, in FIG. 2, the first setting station A is eliminated while the second setting station B is used. In this case, setting the two end portions of an optical fiber to be measured and positioning them in two directions perpendicular to the fiber axis direction are achieved by setting them on the V-blocks of the holders and positioning the two end portions in the fiber axis direction with an axial direction positioning mechanism as shown in FIGS. 2 and 3.

If it is unnecessary to position the two end portions of the optical fiber in the axis direction with high accuracy, the second setting station B can be eliminated and only the first setting station A is used. In this case, setting the two end portions of an optical fiber to be measured and positioning them in two directions perpendicular to each other and to the fiber axis direction are performed by setting them on the V-blocks of the holders, and positioning the two end portions in the fiber axis direction is carried out by allowing their ends to lightly abut against the stops 29 and 30. When the ends of the two end portions of the optical fiber are abutted against the stops as decribed above, they may be deformed, which leads to errors in positioning the two end portions of the optical fiber in the fiber axis direction. Furthermore, the method suffers from the difficulties that dust may accumulate on the end faces of the optical fiber or the end faces may be damaged.

In the above-described example of an optical fiber characteristic measuring apparatus of the invention, a transmission method in which both ends of an optical fiber to be measured are coupled to the measuring device side is practiced at each station. On the other hand, in the case where a back scattering measurement method is employed in the optical fiber characteristic measuring apparatus the following method can be employed: At the measurement station where the back scattering measurement method is carried out, one of the measuring device side holders is eliminated and a directional optical coupler is provided for the measuring device side optical fiber held by the remaining holder so that the light beam from the light source is applied through the coupler to the measuring device side optical fiber. The back scattered beam passed through the measuring device side optical fiber is applied through the same coupler to the optical detector.

In the above-described measuring apparatus, eight pairs of optical fiber holders 13 and 14, 13A and 14A . . . and 13G and 14G are provided on the movement stage 15. It should be noted, however, that the invention is not limited thereto or thereby, and the number of pairs of fiber holders can be any desired value.

In the above-described embodiment of the invention, the optical fibers are employed to conduct the light beams from the light source through the optical fibers under measurement to the optical detectors. However, the optical fibers may be replaced by optical systems including lens systems, glass rods, apertures and pin holes.

Furthermore in the above-described embodiment, when it is not required to perform the positioning operation with a high accuracy, precise alignment at the light incidence and emergence ends may be omitted at some of the stations, and a measurement station in which no position adjustment is carried out may be provided in addition to the auxiliary station.

In the above-described embodiment, a transmission loss measurement or back scattering measurement is performed according to the transmission method. However, if a lens system and a television camera are employed as light detectors and are provided at the light emergence end, according to the position adjusting method of the invention, structural parameters such as the core diameter and outside diameter of the optical fiber can be measured.

When all desired parameters of all the optical fibers set on the movement stage have been measured, it is necessary to move the movement stage in the direction opposite to the direction of the arrow a. The number of times of returning the movement stage is inversely proportional to the number of holders provided on the movement stage with respect to the number of optical fibers. That is, if the number of holder provided on the movement stage is N (N pairs of holders in the case of the transmission method, and N holders in the case of the back scattering measurement method), the movement stage is returned every time it has made N steps.

In any event, it is necessary to move the movement stage in the direction of the arrow a and in the opposite direction; that is, it must be reciprocated. For this purpose, the apparatus may be modified as follows: The auxiliary stations G and F are employed as the first and second setting stations, respectively. The stops 29 and 30 are provided at the station G, and the photosensors S and S' are installed at the station F so that setting stations are provided on both sides of the measurement stations.

In the measuring apparatus thus modified, the optical fiber characteristic measurement can be carried out as follows: The movement stage 15 is moved in the direction of the arrow a to perform the measurements. After the measurements have been achieved by moving the movement stage, i.e., all the optical fibers have been removed from the stage, and optical fibers to be measured are set on the holders beginning with the holders 13 and 14 at the station G, that is, while the movement stage 15 are being moved in the opposite direction, the optical fibers are successively set on the holder and the measurements are carried out at the same time.

In this case, the optical fiber characteristic measurements are carried out not only when the movement stage is moved in one direction, but also when it is moved in the opposite direction. Thus, the efficiency of measurement is further improved.

In the above-described embodiment, only one movement stage 15 is provided. However, the apparatus may be modified so as to employ a plurality of movement stages arranged in a line (extending in the direction of the arrow a). If, for instance, first and second movement stages each having five pairs of holders for optical fibers to be measured are provided, the first and second movement stages are moved in the stated order. When the top of the second movement stage reaches the measurement station E and the tail of the first movement stage reaches the auxiliary station F, the optical fiber is removed from the auxiliary station F and the first movement stage is returned to the setting station.

The moving mechanism is simple in the case where the measuring apparatus has a single movement stage, but it is intricate in the case where it has a plurality of movement stage. However, it should be noted that each of the plural movement stages can be reduced in size. The number of optical fiber holders provided on one movement stage and the number of movement stages can be freely determined taking into consideration the efficiency and accuracy in movement of the movement stage or stages.

In the above-described embodiment, three measurement stations are provided. However, the invention is not limited thereto or thereby. That is, the number of measurement stations can be any desired value. Also, the number of measurement stations should be increased to perform a number of measurements at the same time.

As is apparent from the above description, with the optical fiber characteristic measuring apparatus of the invention, a number of measurement items of optical fibers can be automatically, continuously and simultaneously measured. Therefore, with the inventive apparatus, one operator can measure a number of parameters easily and with a high efficiency.

Figure 9:
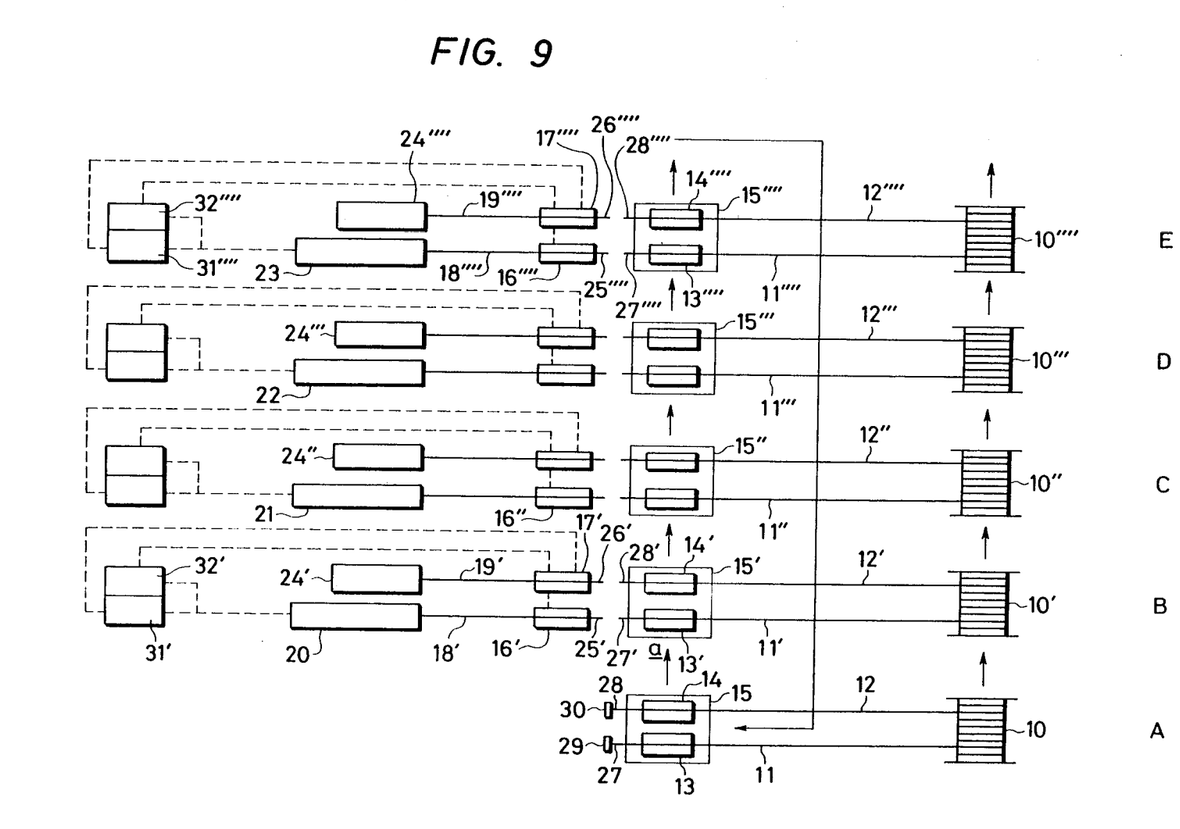
FIG. 9 is a diagram showing schematically another embodiment of a measuring apparatus of the invention.
Figure 10:
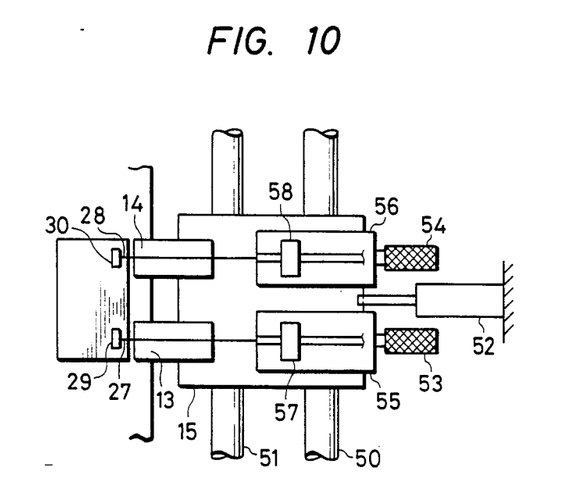
FIGS. 10 through 14 are diagrams of an alignment device used in the embodiment of FIG. 9.
Figure 11:
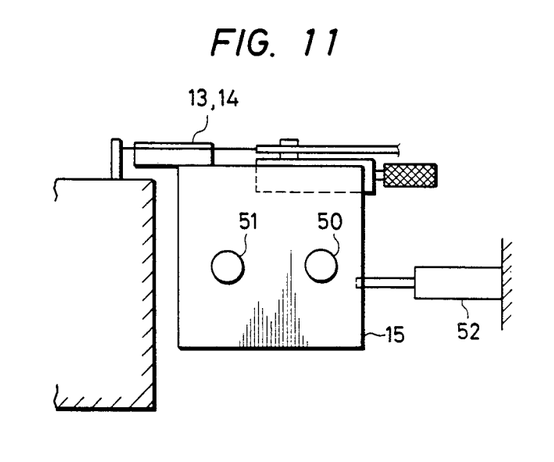
Figure 12:
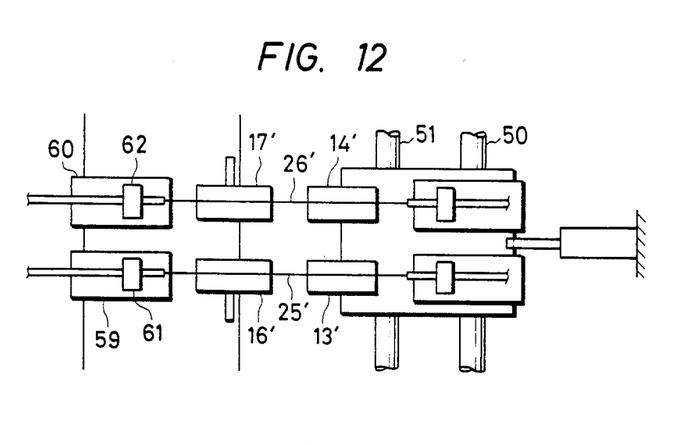
Figure 13:
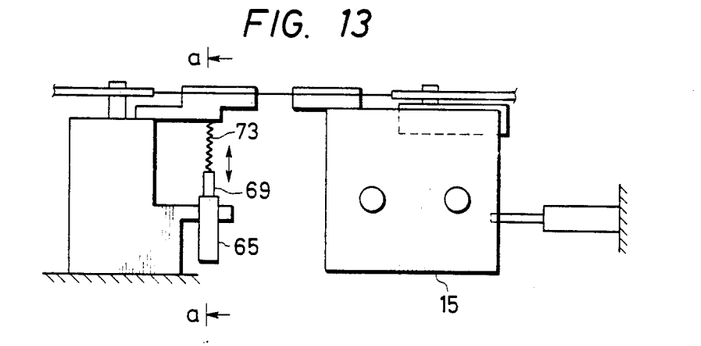
Figure 14:
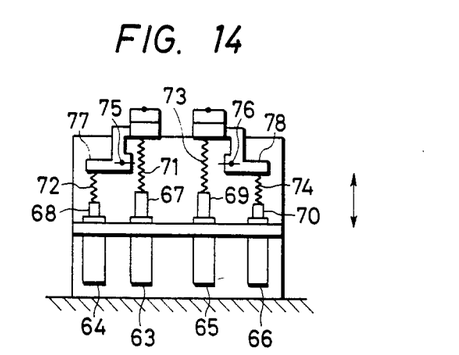

The invention will be further described with reference to another embodiment shown in FIGS. 9 through 14. FIG. 9 is a diagram showing a measuring apparatus, and FIGS. 10 through 14 are diagrams showing an example of an aligning device of this embodiment of the invention.

In FIG. 9, reference numerals 10 through 10'''' designate bobbins on which optical fibers are wound. First end portions 11 through 11'''' of the optical fibers are held by fiber holders 13 through 13'''' provided on the side of the bobbins, and the remaining end portions 12 through 12'''' are held by fiber holders 14 through 14''''. In this case, the fiber holders 13 through 13'''' are provided on the light incidence side, while the fibers 14 through 14'''' are provided on the light emergence side. The fiber holders 13 and 14, 13' and 14', ... and 13'''' and 14'''' are installed on carriers 15 through 15'''', respectively. The carriers 15 through 15'''' are moved in the direction of the arrow a one step at a time by an automatic drive device (not shown), while the bobbins, 10 through 10'''' are also moved in the direction of the arrow one step at a time in synchronization with the carriers.

In FIG. 9, reference numerals 16' through 16'''' and 17' through 17'''' designate holders for holding optical fibers 18' through 18'''' and 19' through 19'''', respectively, which are provided on the side of measuring devices. In other words, the holders 16' through 16'''' are provided on the light reception side and the holders 17' through 17'''' are provided on the light source side. The optical fibers 18' through 18'''' are coupled to measuring devices 20, 21, 22 and 23, respectively, which are adapted to perform different measurements. The optical fibers 19' through 19'''' are connected to light sources 24' through 24''''. The ends 25' through 25'' of the optical fibers 18' through 18'''' and the ends 26' through 26'''' of the optical fibers 19' through 19'''' are positioned so that they are maintained in alignment with the carriers when the carriers are shifted in the direction of the arrow a. Stops 29 and 30 are provided for positioning the ends 27 and 28 of the fiber. The fiber holders 16' through 16'''' provided on the light reception side and the fiber holders 17' through 17'''' provided on the light source side have aligning mechanisms (described later), each of which can move the holder in two directions perpendicular to the axis of the fiber.

Further in FIG. 9, reference numerals 31' through 31'''' and 32' through 32'''' designate controllers for controlling the aforementioned aligning mechanisms. The former are used for alignment of the fiber holders 17' through 17'''' provided on the light source side, while the latter are used for alignment of the fiber holders 16' through 16'''' provided on the light reception side. Reference characters A through E designate operation stages. In the operation stage A, an optical fiber to be measured is set in place, and in the remaining operation stages B through E, different measurements are carried out.

First, in the operation stage A, both end portions of an optical fiber to be measured are manually set on the fiber holders 13 and 14 in such a manner that the end faces 27 and 28 of the end portions abut against the fiber stops 29 and 30, respectively, i.e., so that the end faces are in a predetermined positional relationship with respect to the carrier 15. Thereafter, the carrier 15 is moved on rails (not shown) to the operation stage B while the carriers 15', 15'' and 15''' are shifted to the operation stages, C, D and E, respectively, and at the same time the fiber end portions 11'''' and 12'''' are removed from the holders 13'''' and 14'''' of the carrier 15'''' and the carrier 15'''' is shifted to the operation stage A. As described above, as the carriers are shifted the bobbins are also shifted.

Alignment of the end faces of the fibers provided on the side of the measuring device with the end faces of the end portions of the fiber on the side of the bobbin will be described. When the fiber end portions 11' and 12', which have been positioned in the fiber axis direction by the fiber stops 29 and 30, arrive at the next operation stage B, the carrier 15, being moved on rails, has been positioned in the fiber axis direction. Since the holders 13' and 14' are fixedly positioned on the carrier 15', the positions, in the fiber axis direction, of the fiber ends 27' and 28' are constant with respect to the rails (not shown).

Accordingly, the positional relationship, in the fiber axis direction (A direction), between the fiber ends 25' and 26' on the side of the measuring device, which have been held at predetermined positions, and the fiber ends 27' and 28' on the side of the bobbin is constant at all times so that a predetermined clearance is maintained therebetween. Under this condition, the aligning controllers 31' and 32' are operated to move the fiber holders 16' and 17' provided on the side of the measuring device so that the fiber ends 25' and 26' are finely moved in directions (X and Y directions) perpendicular to the fiber axis direction.

The aligning controllers 31' and 32' receive a light reception output by the measuring device 20 and operate to maximize the light reception output. After alignment in the fiber axis direction and in the directions perpendicular to the fiber axis direction has been achieved accurately, measurement is carried out. After the measurement of the fiber at the operation stage B has been accomplished, the carrier is shifted to the operation stage C. In this manner, aligning and measuring the optical fibers are successively carried out while another optical fiber is set in the operation stage. That is, aligning, measuring and setting of optical fibers are carried out in a parallel mode. After the measurement of the fiber at the operation stage E has been achieved, the end portions of the fiber wound on the bobbin 10'''' are removed from the holders by a device (not shown), and the bobbin 10'''' is transferred to another processing station while the carrier 15'''' is returned to the operation stage A.

In the above-described apparatus, as in the first-described embodiment, an operator can achieve a number of measurements quickly and easily. In the steady condition that the bobbins are provided at all the operation stages, irrespective of the numbers of measurements, one bobbin passed through the measurement is outputted every time the carriers are shifted. With the conventional apparatus, the number of measurements which one operator can handle is only two. On the other hand, using the invention, not only can the number of measurements which one operator can handle but also the capacity of measurement of one operator can be markedly increased.

The carriers 15 through 15'''' can also be circularly moved in a horizontal or vertical plane to carry out various characteristics measurement on the optical fiber.

We claim:

1. An optical fiber characteristic measuring apparatus, comprising:
   a movement stage movable along a straight line;
   a setting station arranged in the direction of movement of said movement stage; and
   a plurality of measurement stations having measuring devices and first holders for holding optical fibers on said measuring devices and arranged along a straight line extending parallel to the direction of movement of said movement stage with a predetermined distance therebetween;
   said movement stage having a plurality of second holders for holding optical fibers to be measured, said second holders being arranged along a straight line extending parallel to the direction of arrangement of said first holders with the same distance as said predetermined distance therebetween.

2. The apparatus as claimed in claim 1, wherein in at least one of said measurement stations is provided with one pair of said first holders, and means are provided for measuring an optical fiber characteristic according to a transmission method, and at least two pairs of said second holders are provided on said movement stage, each pair of said second holders being adapted to hold two end portions of an optical fiber to be measured.

3. The apparatus as claimed in claim 1, wherein the number of said first holders provided in at least one of said measurement stations is one, and means for measuring an optical fiber characteristic according to a back scattering method is provided.

4. The apparatus as claimed in claim 1, further comprising a photosensor provided in said setting station, said photosensor having a light emergence optical fiber and a light incidence optical fiber adapted to be aligned with the two end portions of an optical fiber to be measured and held by said second holders.

5. The apparatus as claimed in claim 4, wherein each of said second holders comprises holding means for holding one of two end portions of an optical fiber to be measured laid thereon in such a manner that said end portion is slidable in the axial direction thereof and is not movable perpendicularly to the axial direction thereof, and further comprising means for feeding said end portion held by said holding means in an axial direction thereof until an end face of said end portion is detected by said photosensor so that the end face of said end portion is held at a predetermined position.

6. The apparatus as claimed in claim 5, wherein said holding means comprises: a V-block on a bottom of which said end portion is laid, and an optical fiber retainer placed in a V-shaped groove of said V-block.

7. The apparatus as claimed in claim 1, further comprising, in one of said measurement stations, an aligning mechanism for adjusting the position of each of said optical fibers provided on said measuring device therein in two directions perpendicular to each other and to the axis of the respective end portion of said optical fiber under measurement.

8. The apparatus as claimed in claim 7, wherein said aligning mechanism comprises:
   a pair of said first holders adapted to hold said optical fibers provided on the said measuring device and supported by elastic arms, and actuators for displacing each optical fiber provided on the side of said measuring device in said two directions perpendicular to each other and to an axis of the respective end portion of said optical fiber to be measured.

9. The apparatus as claimed in claim 1, wherein a plurality of setting stations in which optical fibers to be measured are set in place are arranged on both sides of said measurement stations, and further comprising means for reciprocating said movement stage between said setting stations.

10. A method for measuring characteristics of an optical fiber with a measuring apparatus having plural measurement stations and at least one setting station disposed in a line with a measuring device at each measurement station having two parallel optical fibers for transmitting and receiving light respectively, and a movement stage having a plurality of support stands disposed in a line parallel to the line of stations for supporting the ends of optical fibers to be measured parallel to each other, comprising the steps of:
   (a) moving said movement stage parallel relative to said measurement and setting station so that the ends of the optical fiber to be measured on each stand are sequentially moved into position adjacent each of said setting and measurement stations;
   (b) adjusting the ends of the optical fiber to be measured in the axial direction thereof relative to the support stands; and (c) adjusting the positions of the two parallel optical fibers on each measuring device in two directions perpendicular to each other for aligning the ends of the two parallel optical fibers on said measuring device with the ends of an optical fiber to be measured on an adjacent support stand.

11. An optical fiber characteristic measuring apparatus comprising:

a movable movement stage having a plurality of pairs of support stands disposed in a line thereon for supporting the ends of a plurality of optical fibers to be measured parallel to each other with a predetermined spacing between each of said pairs of stands; and at least one setting station and a plurality of measurement stations disposed in a line parallel to said line of support stand with the same predetermined spacing between each station whereby upon movement of said movement stage in the direction of said line of support stands, each pair of support stands will be sequentially brought into position adjacent one of said stations.

* * * * *